Oct. 18, 1949.　　F. A. HASSMAN ET AL　　2,484,885
VERTICAL SPINDLE MILLING MACHINE
Filed Feb. 25, 1944　　　　　　　　　　　　　7 Sheets-Sheet 1

INVENTOR.
FRED A. HASSMAN
CHARLES HERFURTH
BY Leigh W. Wright.
ATTORNEY.

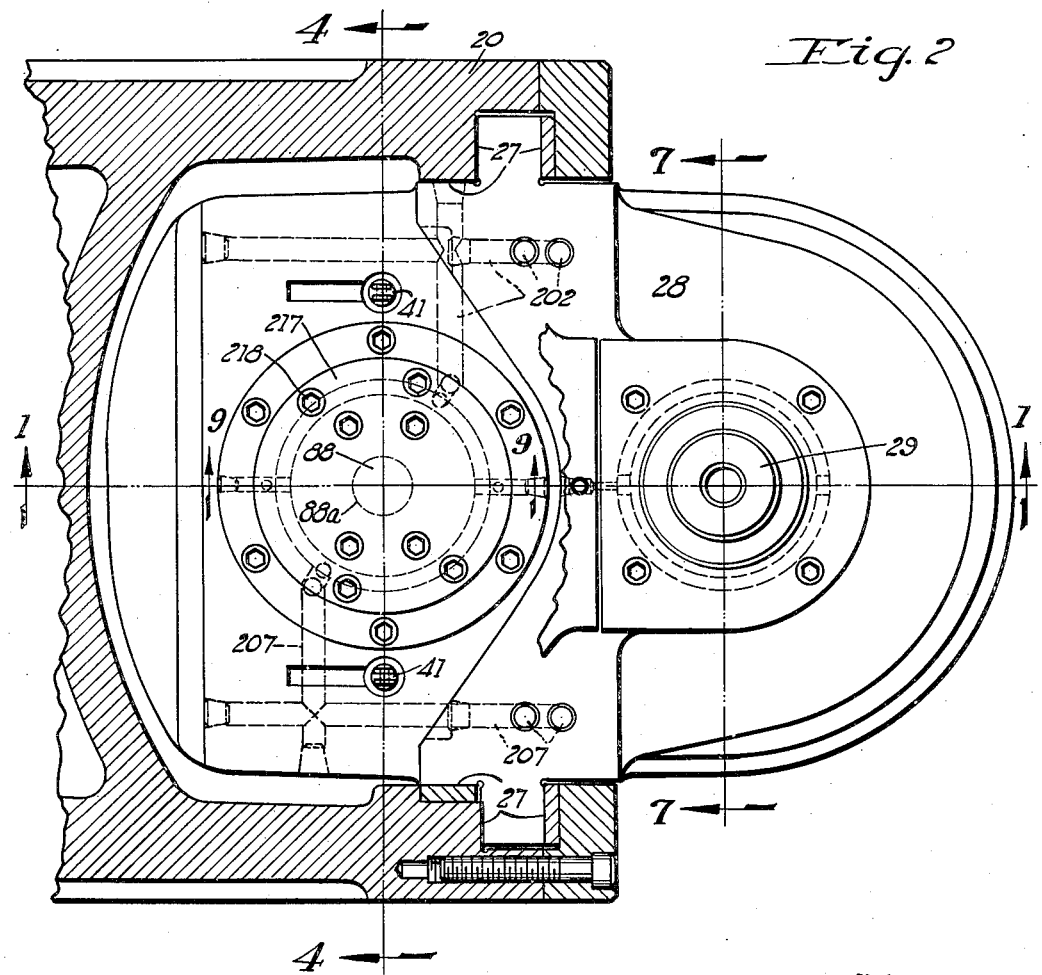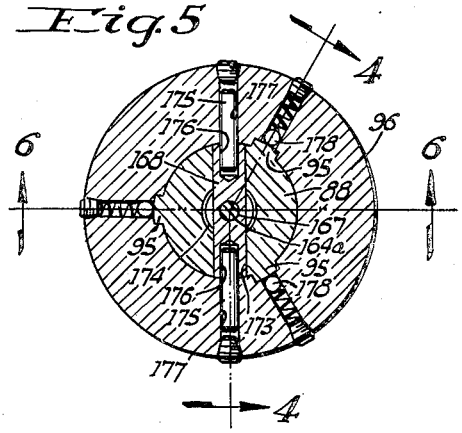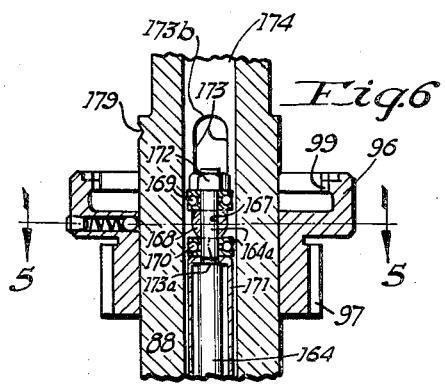

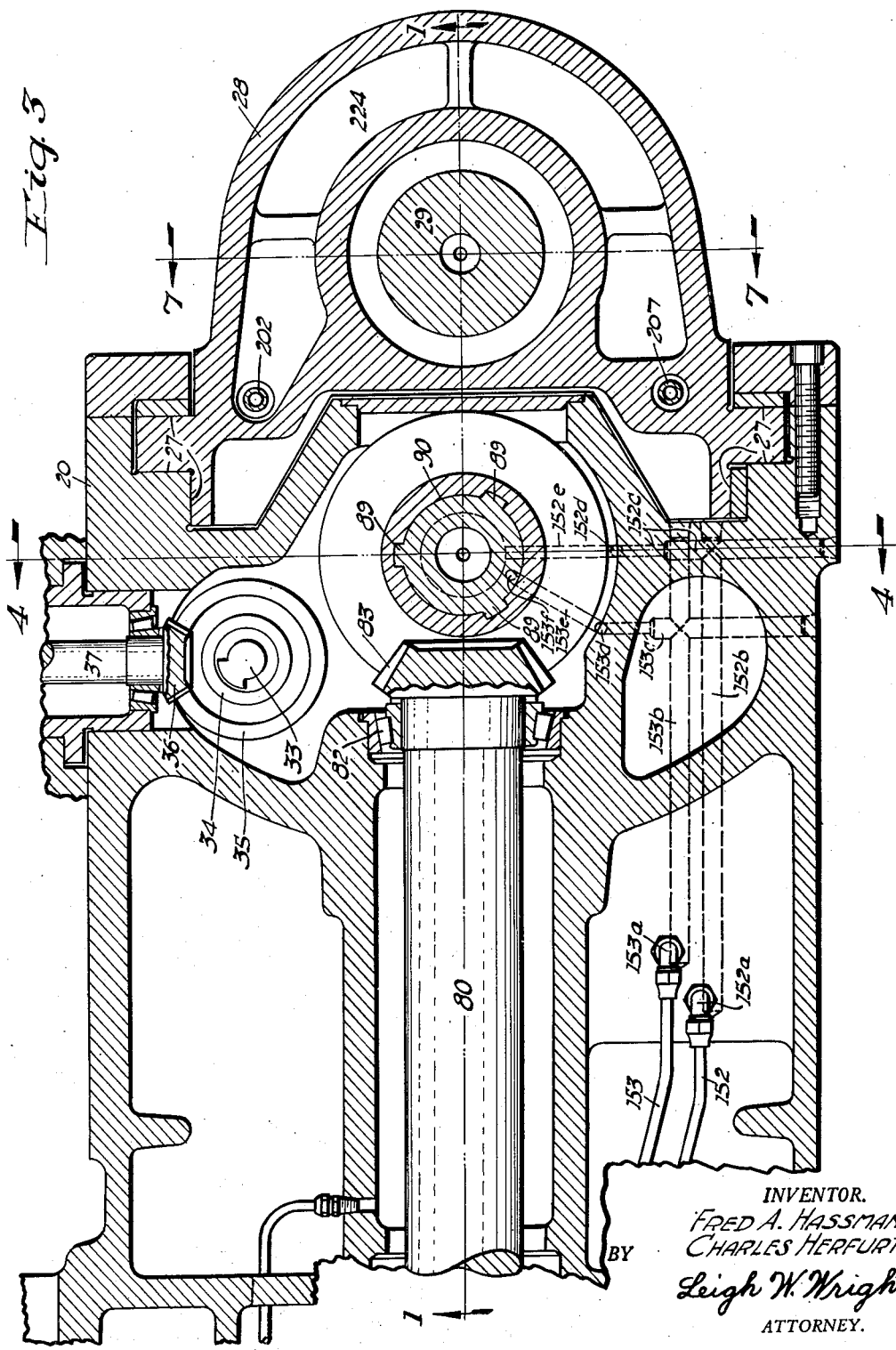

INVENTOR.
FRED A. HASSMAN
CHARLES HERFURTH
BY
Leigh W. Wright
ATTORNEY.

Oct. 18, 1949.　　F. A. HASSMAN ET AL　　2,484,885
VERTICAL SPINDLE MILLING MACHINE
Filed Feb. 25, 1944　　7 Sheets-Sheet 5
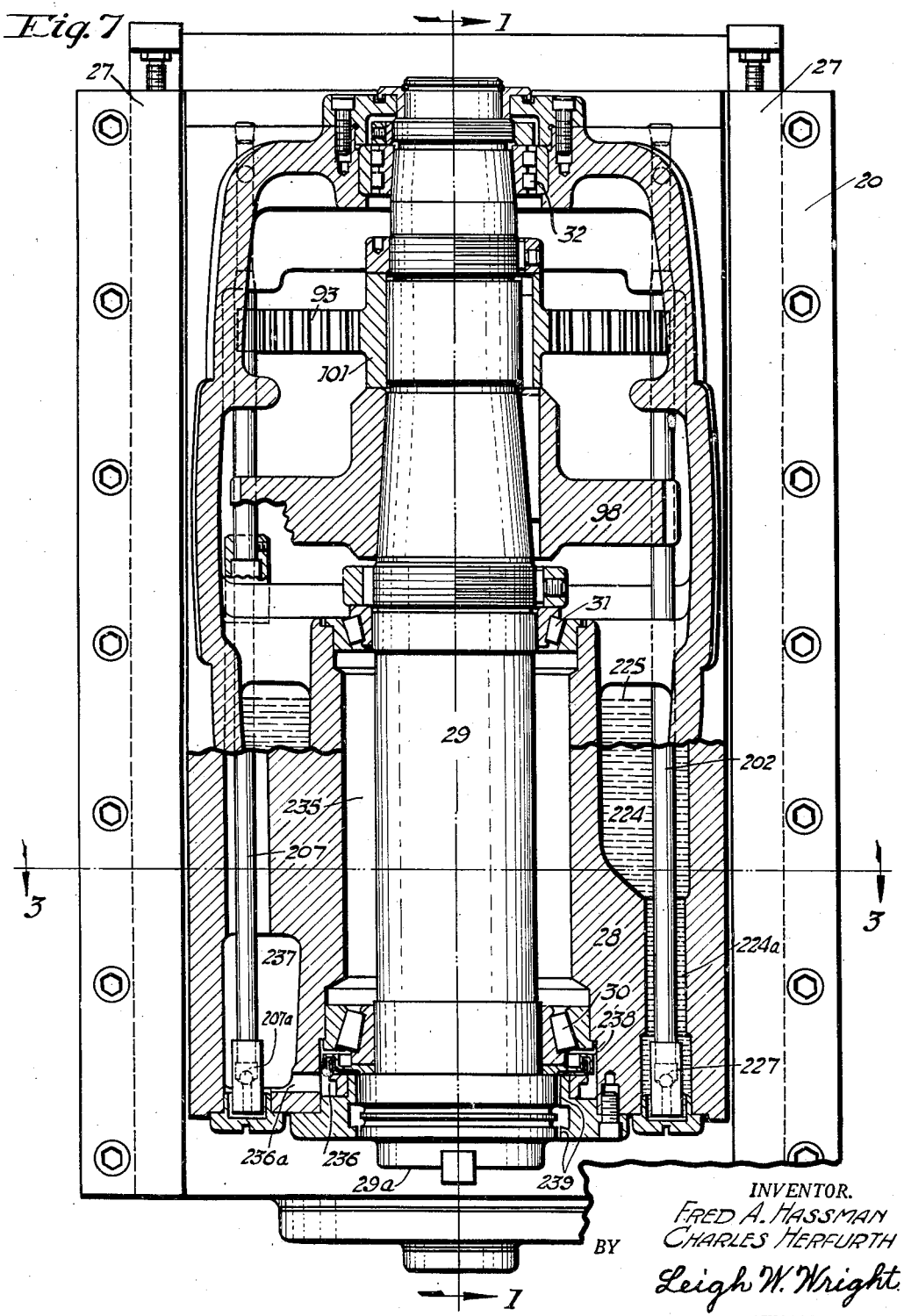
INVENTOR.
FRED A. HASSMAN
CHARLES HERFURTH
BY
Leigh W. Wright
ATTORNEY.

Oct. 18, 1949.  F. A. HASSMAN ET AL  2,484,885
VERTICAL SPINDLE MILLING MACHINE
Filed Feb. 25, 1944  7 Sheets-Sheet 6
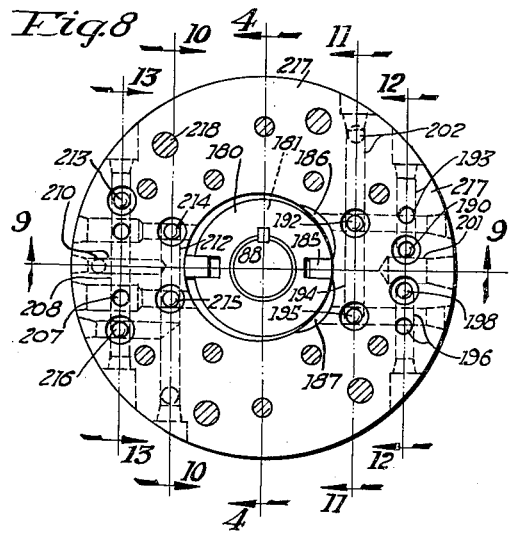
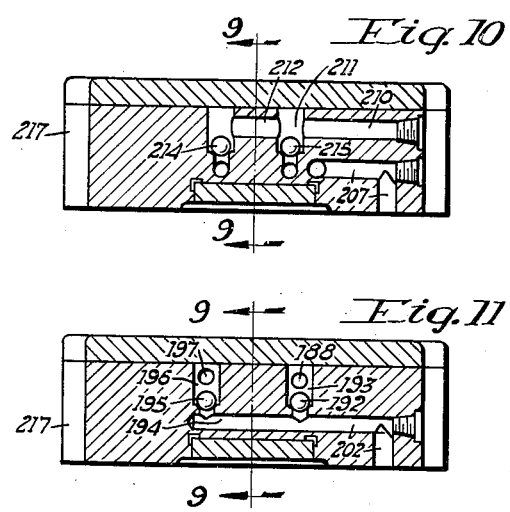
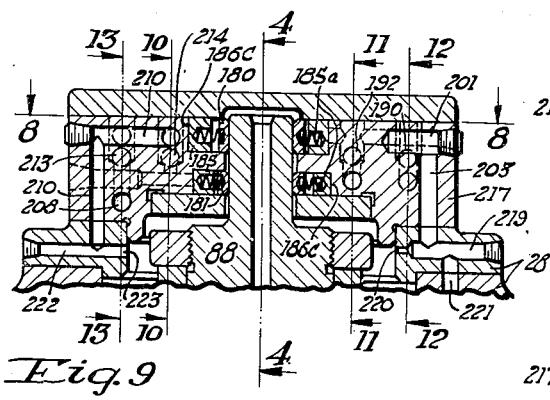
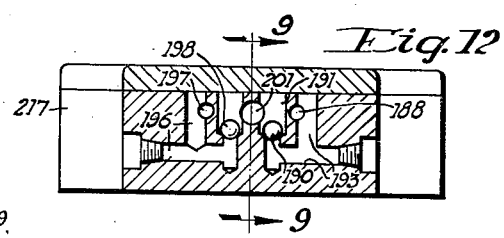
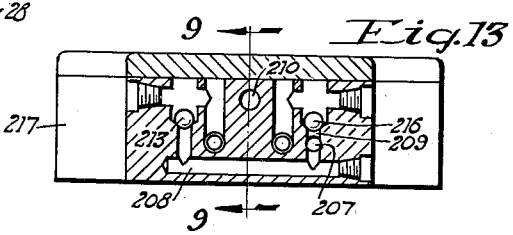
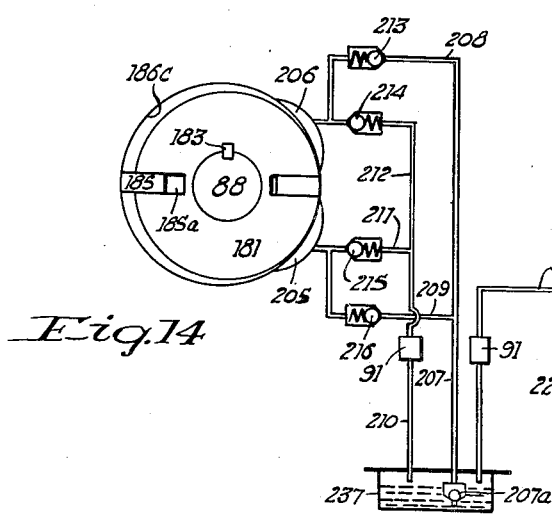
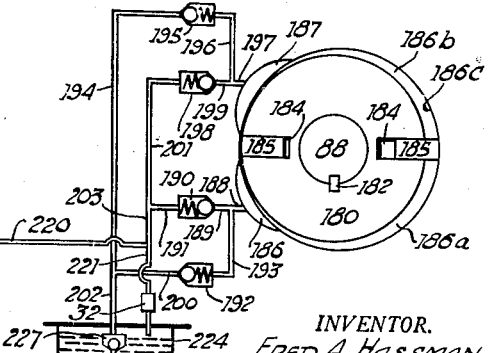
INVENTOR.
FRED A. HASSMAN
CHARLES HERFURTH
BY Leigh W. Wright
ATTORNEY.

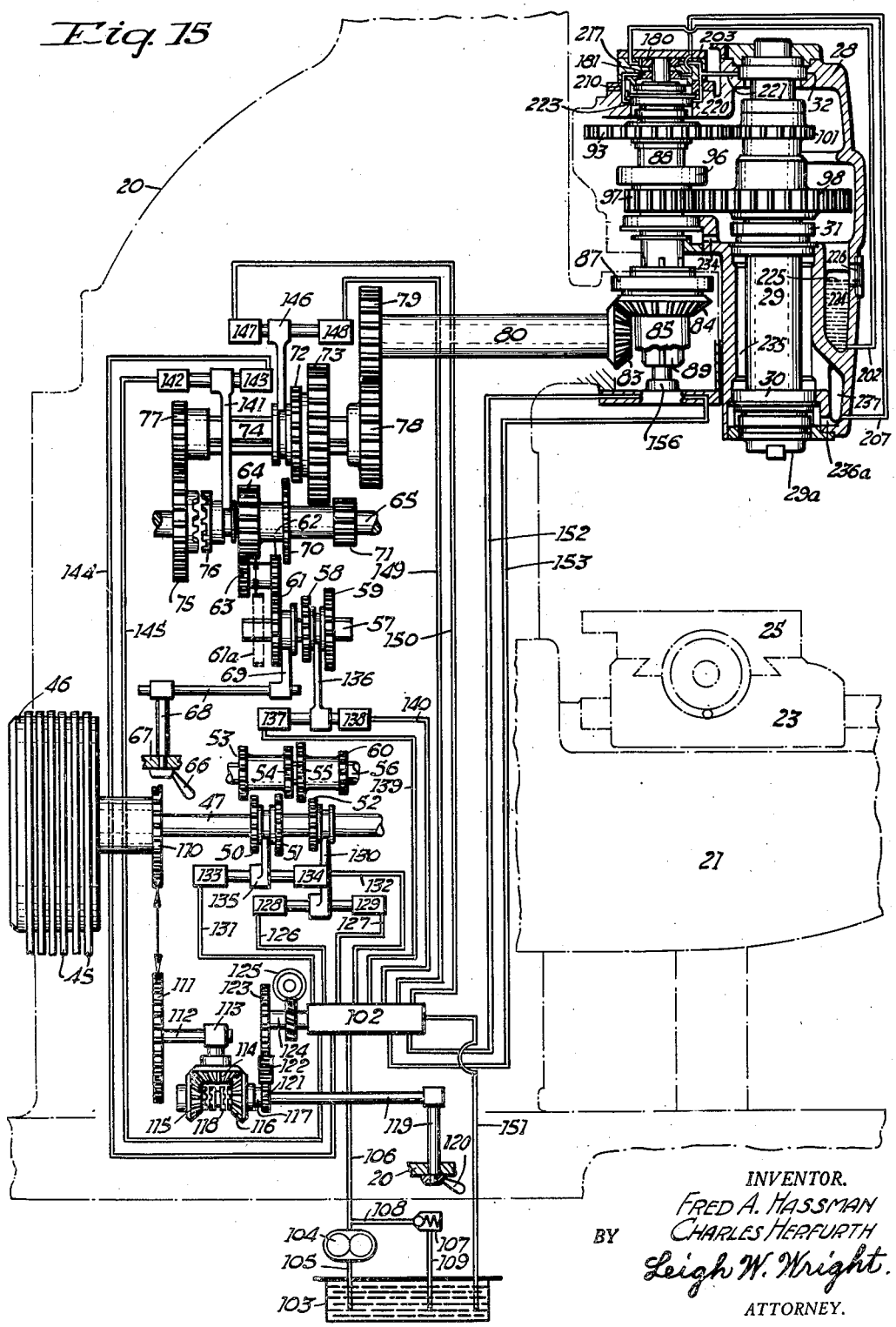

Patented Oct. 18, 1949

2,484,885

UNITED STATES PATENT OFFICE 2,484,885

VERTICAL SPINDLE MILLING MACHINE

Fred A. Hassman and Charles Herfurth, Cincinnati, Ohio, assignors to The Cincinnati Milling Machine Co., Cincinnati, Ohio, a corporation of Ohio Application February 25, 1944, Serial No. 523,926

3 Claims. (Cl. 90—16)

This invention relates to transmission and control mechanism for machine tools, and more particularly for milling machines.

It is a general object of the present invention to provide improved control mechanism adapted for operation from one part of a machine to effect control of an apparatus in another relatively movable part of the machine.

It is also an object to provide a milling machine of the vertical spindle sliding head type with improved and simplified hydraulic compensating mechanism combined with hydraulic gear shifting apparatus operative to maintain constant relationship between hydraulic shifting apparatus in the column of the machine and hydraulically shiftable gearing in the sliding head for any position of the sliding head on said column.

And still another object is to provide an improved self-contained lubricating system in the sliding head of a vertical spindle sliding head milling machine.

And a further object is to provide in conjunction with a fluid pressure speed charging system and a lubricating system located in the same chamber of a machine tool, an arrangement to isolate the fluid in one system from the fluid in the other system.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which similar reference characters are employed to denote the same or similar parts:

Figure 2 is a fragmentary plan view of the milling machine particularly showing the top of the sliding head as indicated by the line 2—2 in Figure 1.

Figure 3 is a horizontal section through the milling machine on the line 3—3 of Figures 1, 4 and 7.

Figure 5 is a section on the line 5—5 of Figures 4 and 6.

Figure 6 is a fragmentary vertical section on the line 6—6 of Figure 5.

Figure 7 is a vertical section on the line 7—7 of Figures 1, 2, and 3.

Figure 8 is a horizontal section on the line 8—8 of Figures 4 and 9.

Figure 9 is a vertical section on the line 9—9 of Figures 2, 8, 10, 11, 12 and 13.

Figure 10 is a section on the line 10—10 of Figures 8 and 9.

Figure 11 is a section on the line 11—11 of Figures 8 and 9.

Figure 12 is a section on the line 12—12 of Figures 8 and 9.

Figure 13 is a section on the line 13—13 of Figures 8 and 9.

Figure 14 is a diagram of the circuit of the self-contained lubricating system for the vertical spindle head.

Figure 15 is a diagram of the change speed transmission, showing the associated hydraulic control mechanism and lubricating system for the milling machine.

Figure 1:
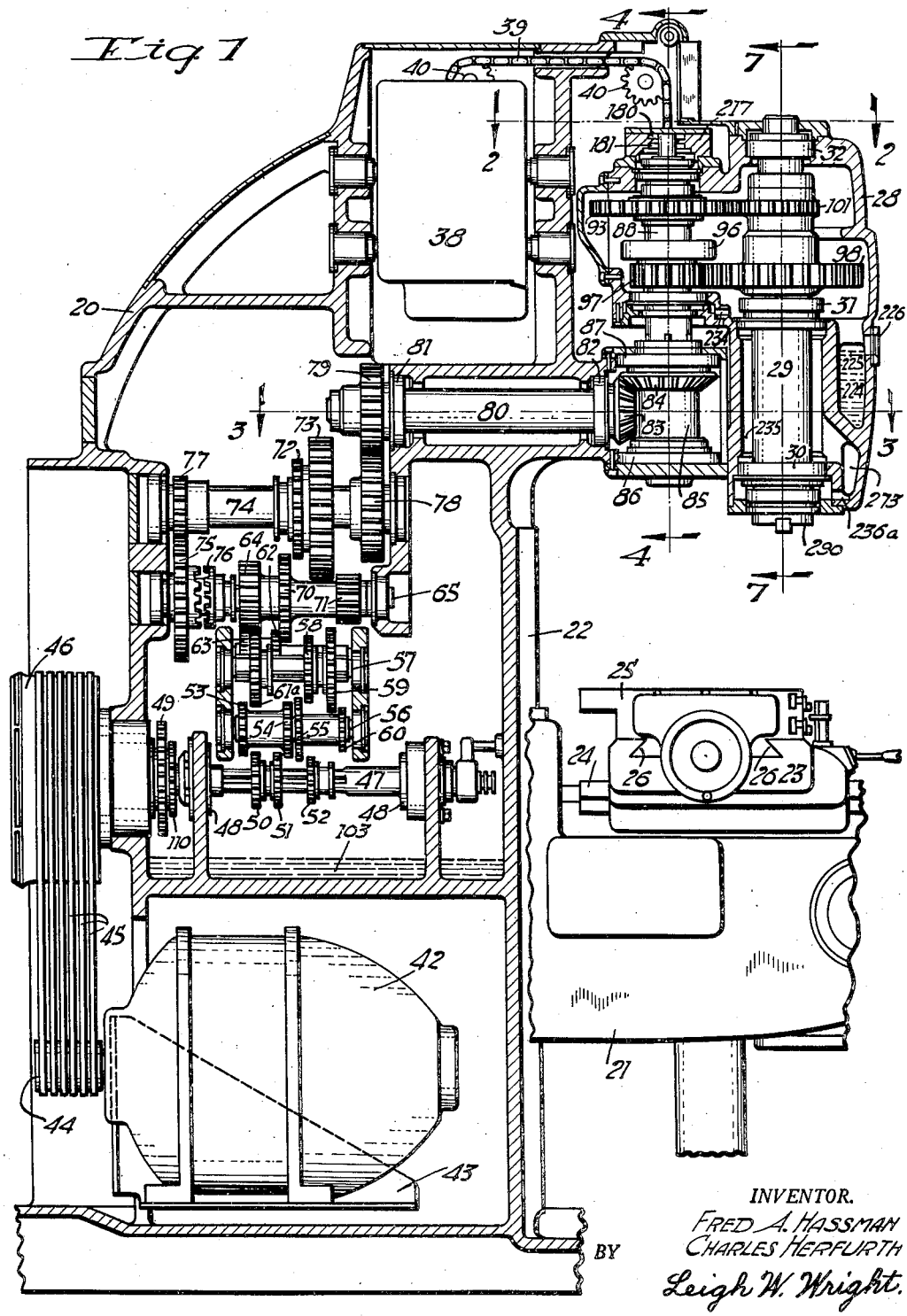
Figure 1 is a side elevation mostly in section of a vertical spindle sliding head milling machine on the line I—I of Figures 2, 3, 4 and 7.

In some machine tools, particularly in a vertical spindle sliding head type milling machine having a change speed transmission for rotating the spindle at a selected series of speeds, it is desirable that the transmission apparatus be divided into several independent speed changing mechanisms arranged in series relation and that one of the mechanisms of the series be carried by the sliding head carrying the cutter spindle. It is further desirable that a single remote speed changing control element, preferably mounted on the column or knee of the milling machine, be arranged to actuate all of the speed changing mechanisms in a predetermined sequence in order to establish any desired rate of speed for the spindle. As illustrative of such a milling machine to which this invention may be applied, there is shown a vertical spindle sliding head type machine, Figure 1, comprising a main frame or a column 20 having a knee 21 slidably mounted on appropriate guideways 22 formed on the front of the column. On the ways 24 of the knee is mounted the saddle 23, which in turn carries the work table 25 on appropriate dovetail guideways 26. On the upper portion of the column 20 vertically slidable in guideways 27, Figures 2, 3, and 7, is the spindle carrier or head 28 in which is journaled the cutter spindle 29 against axial movement in appropriate bearings 30, 31 and 32 as best seen in Figure 7.

The sliding head 28 may be reciprocated vertically by any appropriate means such as an elevating screw 33, Figure 3, which may be fixed in the sliding head 28 and around which operates an elevating nut 34 journaled against axial movement in the column 20 and having formed thereon a bevel gear 35 which is engaged by a bevel gear 36 carried on a shaft 37 journaled in the column 20 of the machine and upon which a suitable actuating hand wheel (not shown) may be mounted for manual rotation of the shaft 37 or the shaft 37 may be actuated by any appropriate power means. In this way the head may be nicely adjusted up and down on the front of the column to move the cutter spindle 29 relative to the work table 25 for effecting proper adjustment of a cutter on the spindle relative to a work piece on the table. In order to compensate for the natural downward pull of gravity on the head 28 and thus facilitate its movement there is provided a counterweight 38, Figures 1 and 4, suspended by suitable chains 39 passing over sprockets 40 journaled in the column 1 and connected to the top portion of the head 28 by appropriate chain anchoring studs 41.

The main driving power for operating the milling machine cutter spindle and work feeding members is derived from the prime mover or main drive motor 42, Figure 1, appropriately mounted on a suitable support 43 in the base of the column 20. The motor 42 has a driving pulley 44 from which power is transmitted by appropriate belts 45 to the main drive clutch pulley 46 carried on the pulley drive shaft 47 journaled in appropriate bearings 48 in the column 20. The function of the clutch 46 is to connect or disconnect the driving power from the motor 42 with respect to the drive shaft 47, since the motor 42 is normally continuously operating when the machine is in use. Any conventional apparatus, forming no specific part of this invention, may be utilized to control the clutch pulley 46 for connecting or disconnecting power from the motor 42 to the shaft 47. Feed power takeoff for the knee, saddle, and table may be obtained from the gear 49 which is continuously driven by the motor 42 from the pulley 46 through conventional apparatus which forms no specific part of this invention and therefore will not be described in detail herein.

The cutter spindle 29 is driven through a change speed transmission in the column 20 and an associated change speed transmission in the vertically slidable head 28. Both of these transmissions are connected in series and driven from the drive shaft 47. Referring to the change speed transmission in the column 20, there is provided on the shaft 47 a series of shiftable gears 50 and 51, comprising a gear couplet 50—51 and a gear 52 axially slidable in driving relationship on the shaft 47. The gear 50 may be moved into engagement with a gear 53, the gear 51 may be engaged with the gear 54, and the gear 52 engaged with a gear 55 carried on a shaft 56 journaled in the column 20 to thus effect three changes of speed between the shaft 47 and the shaft 56. On a shaft 57 appropriately journaled in the column 20 is mounted a sliding gear couplet comprising the gears 58 and 59 which are respectively engageable with the gear 55 and a gear 60 on shaft 56 to in this way provide two additional speed changes between the shaft 56 and the shaft 57.

The reversing gear 61 is mounted in sliding driving relationship on the shaft 57 and may be moved into engagement with an idler gear 62 appropriately journaled in the column 20. The idler gear 62 also has an integral similar gear 63 connected in driving relationship with the gear 62. The latter gear 63 in turn is in constant mesh with a gear 64 fixed on a shaft 65 journaled in the column 20. The reversing gear 61 may be shifted, as best seen in Figure 15, into engagement directly with the gear 64 when moved to a position 61a, thus driving the shaft 65 in one direction or the reversing gear 61 may be shifted into engagement with the gear 62 as shown to effect transmission of power from the shaft 57 through the gearing 61—62 and 63—64 to rotate the shaft 65 in the opposite direction to thereby provide a reverse to the driving transmission and the cutter spindle 29 associated therewith.

The reversing gear 61 may be shifted to either its position 61 or 61a by an appropriate reversing lever 66, Figure 15, carried in the column 67 and which actuates suitable linkage 68 and the shifter fork 69 to effect the above movements of the reversing gear 61.

Fixed on the shaft 65 is a gear 70 and a gear 71 each respectively engageable by the gears 72 and 73 of the shiftable gear couplet 72—73 slidingly mounted in driving relationship on a shaft 74 journaled in the column 20. Also on the shaft 65 is journaled a gear 75 which may be connected to or disconnected from driving engagement with the shaft 65 by a clutch 76. The gear 75 is constantly in mesh with a gear 77 fixed on the shaft 74. In this way three speed changes may be obtained between the shaft 65 and the shaft 74 by the gear engagements 71—73, 70—72, and by engagement of the clutch 76 so as to effect the drive through the gears 75—77. On the shaft 74 is fixed the driving gear 78 which drives a gear 79 fixed on the shaft 80 appropriately journaled in bearings 81 and 82 in the column 20. On the outer end of the shaft 80 is formed a bevel pinion 83, Figures 3 and 4, which drives a bevel gear 84 fixed to a sleeve 85 journaled in appropriate bearings 86 and 87 in the column 20 of the machine. The above-described gearing mechanism comprises the change speed transmission in the column 20 of the milling machine.

Figure 4:
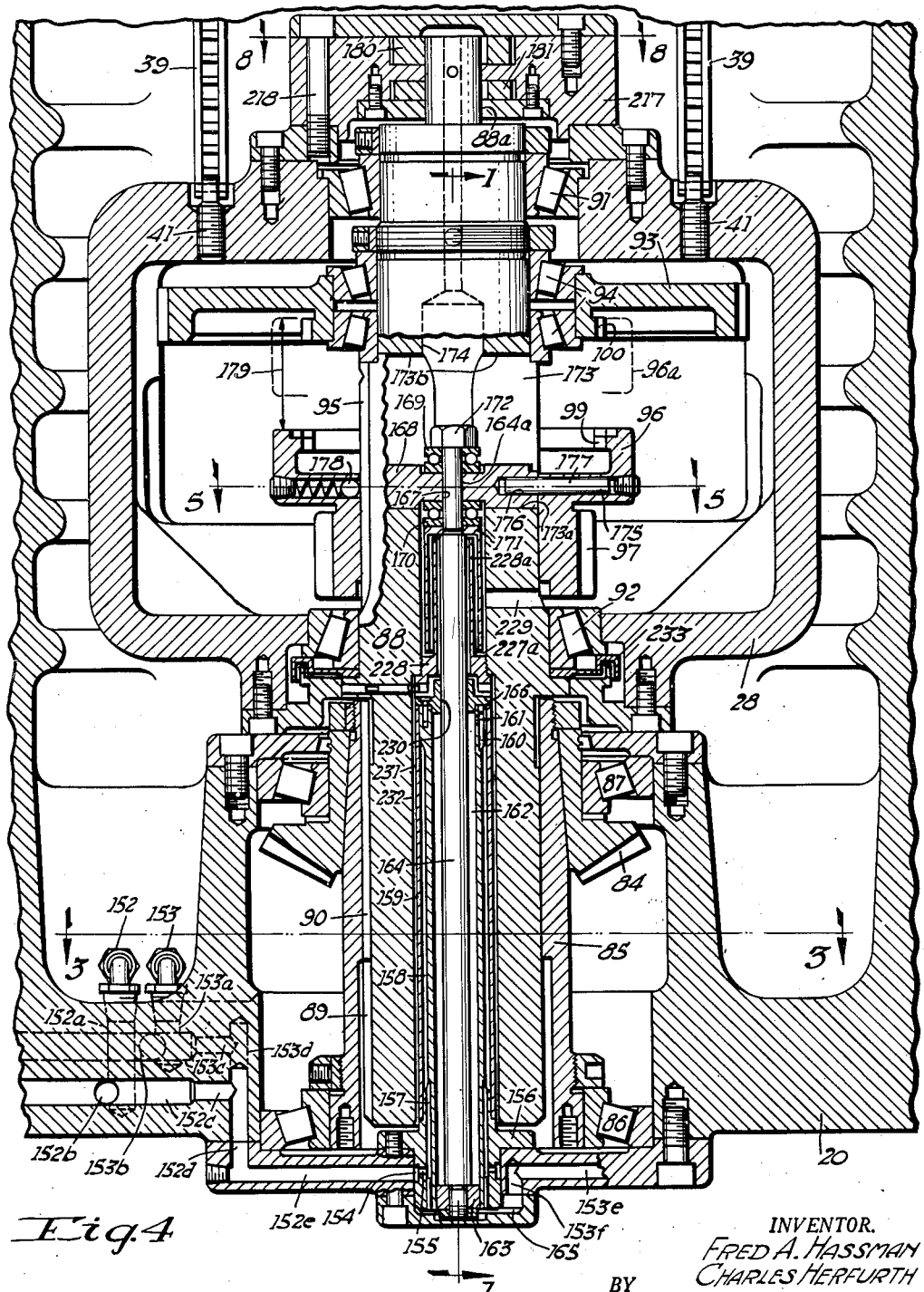
Figure 4 is a vertical section on the line 4—4 of Figures 1, 2, 3, 5, 8, and 9.

Power from this change speed transmission in the column is transmitted to the vertically movable spindle 29 with head 28 through the drive shaft 88, Figures 3 and 4, which has a downwardly extending portion having splines 89 formed thereon which slidingly fit in driving engagement in the splined bore 90 of the sleeve 85. The shaft 88 is journaled against axial movement in the spindle head 28 on appropriate bearings 91 and 92. The shaft 88 thus may be driven at all times for any vertical position of the spindle head 28 on the column 20.

A change speed transmission is provided between this shaft 88 and the cutter spindle 29 comprising a high speed driving gear 93 journaled for free rotation on suitable bearings 94 on the shaft 88 as best seen in Figure 4. Also slidably mounted in driving engagement on splines 95 formed on the shaft 88 is shiftable member 96, Figures 4, 5 and 6. The member 96 has a low speed driving gear or back gear pinion 97 which may engage the large low speed driving gear 98 fixed on the cutter spindle 29 when the member 96 is in a lower downwardly shifted position, Figures 1 and 4. When the member 96 is shifted upwardly to the high speed position its internal clutch teeth 99 engage mating clutch teeth 100 of the high speed driving gear 93 so as to positively lock the gear 93 in driving relationship with the shaft 88 while at the same time disengaging the gear 97 from the gear 98 on the cutter spindle. The gear 93 in turn is in continuous driving relationship with a gear 101 fixed on the cutter spindle 29 so that when the member 96 is in the upper shifted high speed position the driving power from the shaft 88 will be transmitted through the gears 93—101 for the rapid driving of the cutter spindle 29. In this way a series of high and low speed ranges are provided for the cutter spindle 29 by shifting the member 96, this mechanism comprising a change speed transmission in the sliding spindle head 28. It is to be noted that the change speed transmission in the column 20 and the change speed transmission in the head 28 are connected in series through the shaft 80 and associated gearing so that by shifting the gear members in both of said transmissions in appropriate sequential relationship the entire range of spindle speeds may be obtained for the cutter spindle 29.

In order to effect this sequential operation of the change speed transmissions it is desirable to effect all of the changes from a single remote control point comprising single lever control preferably located on the column 20 or at a convenient location on the knee 21 of the machine. The problem, however, is complicated by the fact that a portion of the change speed transmission in the spindle head 28 has bodily relative movement with respect to the change speed transmission mounted in the column. It is, therefore, necessary to provide a mechanism effective at all times to shift the member 96, Figure 4, of the change speed transmission in the head 28 in proper sequential relationship with the change speed transmission in the column for any relative vertical position of the head 28 on the column 20.

In order to obtain these desired results a hydraulic gear shifting control system, as best illustrated in Figure 15, is utilized comprising a main control valve 102 which may be supplied with fluid pressure from a reservoir 103 formed in the base of the column 20 from which a source of fluid pressure or fluid pressure pump 104 withdraws fluid through a line 105 and transmits the fluid under pressure through a line 106 to the control valve 102. A suitable relief valve 107 connected by a line 108 to the pressure line 106 and exhausting through a line 109 into the reservoir 103 serves as a means to limit pressure in the line 106 to a predetermined desired amount. The control valve 102 may be rotated or driven, preferably by power, to a series of predetermined positions for selectively applying fluid pressure from the line 106 to hydraulic actuating means for shifting the various gears of the change speed transmission in the column 20 and spindle head 28 in a predetermined sequence to effect the entire range of speed changes for the cutter spindle 29. The use of such a selector control valve for hydraulic gear shifting is generally set forth in Patent No. 2,012,081, issued August 20, 1935, and therefore further detailed description of the specific structure of the control valve 102 will not be undertaken.

The valve 102, referring to Figure 15, may be driven from any suitable means such as a power take-off gear 110 connected to the pulley 46 which drives a gear 111 of a shaft 112 which, through appropriate spiral gearing indicated at 113, drives a bevel gear 114 which engages a pair of reversing bevel gears 115 and 116. These reversing bevel gears may be engaged alternately to a drive shaft 117 by shifting the reversing clutch 118 through the linkage 119 connected to a control lever 120 which may be conveniently located on the column 20 or the knee 21 as desired, said control lever 120 serving to select the entire range of speeds for the cutter spindle 29. When the lever 120 is shifted to actuate the reversing clutch 118 power may be transmitted in one direction or the other through the gears 121, and 122 and the gear fixed to the operating shaft 124 for the control valve 102. An appropriate dial indicating means, indicated generally at 125, may be provided to show the relative position of the valve 102 and therefore the speed selected for the transmission.

Fluid pressure from the line 106 is selectively distributed by means of the valve 102 through the lines 126 and 127 to the actuating cylinders 128 and 129 for the shifter fork 130 to shift the gear 52. Fluid from the valve 102 also is distributed through lines 131 and 132 to the respective operating cylinders 133 and 134 for the shifter fork 135 to appropriately actuate the gear couplet 50—51 to its selectable positions. The gear couplet 58—59 is actuated by the shifter fork 136 operated by the cylinders 137 and 138 connected to the control valve 102 by the lines 139 and 140. The clutch 76 on the shaft 65 is actuated by a shifter fork 141 by the cylinders 142 and 143 connected to the valve 102 by appropriate lines 144 and 145. Similarly, the gear couplet 72—73 is actuated by the shifter fork 146 by cylinders 147 and 148 connected by lines 149 and 150 to the selector valve 102. The detail structure of the various cylinders for actuating the shifter forks 130, 135, 136, 141, and 146 are of conventional construction as shown in the above-mentioned Patent 2,012,081, and therefore will not be described or shown in detail herein, it being sufficient to state that rotation of the valve 102 to its selected positions will apply pressure and permit exhaust from the respective operating cylinders for the shifter forks to provide a complete sequential operation for the associated shiftable gears in the column 20, exhaust from the cylinders being discharged through the valve 102 and the exhaust or drain line 151 for return of the fluid to the reservoir 103.

The change speed transmission in the sliding spindle head 28 is also shifted in sequential relationship with the shifting of the gears in the column 20 by actuating the member 96 by fluid pressure from the control valve 102. Connected to the control valve 102 are the fluid conducting lines 152 and 153 which communicate with hydraulic shifting mechanism and compensating mechanism for the member 96 on the shaft 88. Referring particularly to Figures 3 and 4, the line 152 is connected to drilled passageways 152a, 152b, 152c, 152d, and 152e, which connects with an annular groove 154 which groove communicates through ports 155 formed in the bottom portion of the shifting and compensating cylinder 156. These ports 155 open into passageways 157 which communicate with grooves 158 formed in the outer surface of the cylinder 156 and which are closed by means of a sleeve 159 closely fitting over the outside of the cylinder 156. The grooves 158 communicate in turn with a passageway 160 connected to a port 161 which opens into the inner chamber 162 in the cylinder 156 above the piston 163 which is connected to the piston rod 164. The line 153 is connected through passageways 153a, 153b, 153c, 153d, 153e, and 153f opening into a chamber 165 which communicates with the lower chamber formed in the cylinder 156 below the piston 163. Thus, fluid pressure may be applied in one or the other of the lines 152 and 153 to reciprocate the piston 163 upwardly or downwardly in the cylinder 156.

Referring to Figures 4, 5, and 6, the piston rod 164 extends upwardly through a supporting gland 166, carried by the cylinder 156 and has a reduced end portion 164a which passes through a clearance bore 167 mounted in a cross pin 168. The cross pin 168 is confined against axial movement relative to the piston rod 164 but is permitted free rotation thereabout by means of a pair of thrust bearings 169 and 170 located each side of the pin 168 and confined on the piston rod 164 by an appropriate adjusting nut 172. A lubricant shield 171 is also fixed on the piston rod 164 below the thrust bearing 169. The cross pin 168, referring more particularly to Figures 5 and 6, is axially reciprocable in a diametral slot 173 formed in the shaft 88. There is also provided an axial bore 174 formed in the shaft 88 to accommodate the nut 172, the thrust bearings 169 and 170 on the upper end of the piston rod, and the lubricant shield 171 reciprocable axially inside the shaft 88. The cross pin 168 is thus driven by the sides of the slot 173 and rotates with the shaft 88. The shiftable gear member 96 is connected to this cross pin by means of a pair of pins 175, Figure 5, which nicely fit in bores 176 formed in the ends of the cross pin 168 and in aligned bores 177 formed in the member 96. In this way reciprocation of the piston 163 by fluid pressure from the control valve 102 effects a shifting of the gear member 96.

Thus, when fluid pressure is applied through the line 152 and conveyed to the upper chamber 162 above the piston 163 in the cylinder 156 to urge the piston downward, the gear 97 of the member 96 will be brought into engagement with the low speed gear 98 to effect low speed driving of the cutter spindle 29. When the fluid pressure is applied through the line 153 below the piston 163 to force it upwardly in the cylinder 156 the member 96 will be moved upwardly to engage its clutch 99 with the clutch 100 of the high speed gear 93 to effect high speed driving of the cutter spindle 29 through the gears 93—101. A series of balanced spring-urged ball detents, Figure 5, indicated at 178, operate in detent notches 179 formed in the splines 95 of the shaft 88 serving to normally hold the member 96 in its upper shifted position in the event fluid pressure should be cut off from the line 153 when it is desired to maintain the high speed driving position for the member 96.

It is to be further noted that this hydraulically actuated shifting mechanism for the member 96 of the spindle head change speed transmission also functions as an automatic compensating device whereby the gear 96 may be maintained in either its upper or lower shifted positions, as determined by the setting of the control valve 102, Figure 15, in the column, at all times for any position of the head 28 on its guideways 27 or whether it is being fed up or down by means of the actuating screw 33 and associated mechanism. The cylinder 156 is made relatively long, permitting a greater amount of relative travel of the piston 163 in the cylinder 156 than is required to shift the gear member 96 the distance indicated by the arrow 179 in Figure 4. This additional movement of the piston 163 in the cylinder 156 is provided to take care of the relative movement of the spindle head 28 on the column while maintaining the gear member 96 in either of its shifted positions by fluid pressure from the control valve 102 and pump 104.

When the member 96 is shifted in its downward or low speed position, as shown particularly in Figures 1, 4, and 15, fluid pressure will come in through the line 152 and into the chamber 162 above the piston 163 to hold the cross pin 168 down against the arcuate bottom portion 173a of the slot 173 and thereby hold the gear member 96 fixed with respect to the shaft 88 in its lower position with its gear 97 in running engagement with the gear 98 on the cutter spindle 29. The chamber on the lower side of the piston 163 at this time is connected through the line 153, control valve 102, with the drain line 151 to the reservoir 103. Should the spindle head 28 under these conditions be raised fluid pressure in the chamber 162 would be displaced therefrom as a piston rod 164 and piston 163 is moved up by the upward movement of the head 28, this displaced fluid escaping back through the control valve 102 against the pump pressure from the pump 104 and out through the relief valve 107 to the reservoir 103, thus maintaining the pressure holding the gear member 96 downward while displacing the fluid from the pressure side of the system. As the piston 163 is thus moved upward fluid will be drawn in through the line 153 through the valve 102 and through the exhaust line 151 from the tank 103 so as to maintain this side of the cylinder 156 properly supplied with fluid.

Similarly, should the head be moved downwardly under these conditions, fluid pressure from the pump 104 passing through the line 166, control valve 102 and the line 152 would keep the upper chamber 162 above the piston 163 continuously filled with fluid pressure to cause the piston 163 to move downward with the downward movement of the spindle head 28, thus always keeping the gear 96 in its downward shifted position. Fluid will, of course, be displaced from the chamber below the piston 163 in the cylinder 156 out through the line 153, the control valve 102, and the drain line 151 to the reservoir 103.

It will thus be apparent that fluid pressure may be applied below the piston 163 by delivering pressure from the control valve 102 through the line 153 that the gear member 96 will be moved to its upward shifted position 96a, Figure 4, in engagement with the high speed gear 93 with the cross pin 168 engaging the arcuate portion 173b of the slot 173 in shaft 88. The upper chamber 162 of the cylinder 156 will then be connected to the drain line 151 through the valve 102 and line 152. Under these conditions as in the previous instance, the continuous application of pressure through the line 153 will likewise keep the gear 96 in its upper engaged position 96a with the gear 93 for any upward or downward motion of the spindle carrying head 28.

In this way is provided a combined hydraulic gear shifting mechanism and compensating device for maintaining a shiftable member of a movable change speed transmission in any desired predetermined shifted position, irrespective of the relative position of movement of the movable transmission with respect to a remote control means for effecting the shifting. It will also be noted that there is provided a fluid pressure shiftable change speed transmission, part of which is mounted in one member and another part of which is mounted in another member movable relative to said first-mentioned member in which the entire change speed transmission may be operated in a complete sequential series of speed changes for any relative movement or position of the movable member with respect to the other member of the change speed transmission.

Associated with the sliding spindle head 28 and cooperating with the driving means for the cutter spindle incorporating the hydraulic shifting mechanism and motion compensator, is a self-contained lubricating system for the spindle head mechanism. In this arrangement the shaft 88 is utilized as a drive shaft for rotating the cutter spindle and for actuating a lubricating transmission system incorporated in the sliding head 28 and deriving its source of lubricating fluid from wholly within said spindle head 28. On the upper end of the common drive shaft 88 are mounted a pair of vane pumps having rotors 180 and 181 respectively as best seen in Figures 4 and 14, each of which is keyed to the reduced end portion 88a of the shaft 88 by keys 182 and 183. In slots 184 of the rotors are mounted vanes 185 which are urged radially outward by springs 185a.

Referring to Figure 14, when the shaft 88 is rotating the rotor 180 clockwise, pressure will develop in the arcuate portion 186a while suction will develop in the arcuate portion 186b of the eccentric bore 186c. Under these conditions, the port 186 is a pressure or delivery port while the port 187 functions as a suction or intake port. Fluid pressure is thus transmitted from the port 186 through a line 188, line 189, and check valve 190 into the main lubricating supply line 191. The check valve 192 under these conditions remains closed so that there will be no flow through the line 193. Similarly, intake of fluid to port 187 comes through suction line 194, check valve 195, and lines 196 and 197, the check valve 198 being closed under these conditions.

Upon opposite rotation of the shaft 88, as when the reversing control lever 66 is operated, Figure 15, to reverse the spindle drive transmission for opposite rotation of the cutter spindle 29, the port 186 becomes an intake port and the port 187 becomes a pressure port. Under these conditions fluid will be drawn in through the line 200, check valve 192, line 193, and line 188 to the intake port 186 during which time the check valve 190 remains closed. Delivery fluid will be transmitted from the port 187 through lines 197 and 199, the check valve 198 into the delivery line 201, the check valve 195 remaining closed under these conditions. The lines 194 and 200 which are normal intake lines for the pump for either direction of rotation of the shaft 88 are connected to a common suction line 202, while the lines 191 and 201 are connected together for delivery of lubricating fluid to a pair of supply lines 220 and 221.

Similarly, the pump 181 has ports 205 and 206 each of which may alternately supply pressure or act as intake ports depending upon the direction of rotation of the shaft 88. Thus, the pump 181 normally may withdraw fluid through the strainer 207a of a main suction line 207 through lines 208 and 209 and deliver it under pressure to a main supply line 210 through lines 211 and 212, check valves 213, 214, 215, and 216 as explained in the case of the pump 180.

Preferably the entire arrangement of pump discs, vanes, check valves and circuit shown in Figures 8, 9, 10, 11, 12, 13 and 14 is incorporated in the main pump head 217 which is mounted on top of the spindle carrier or head by appropriate screws 218 so that the reduced end portion 88a of the shaft 88 properly carries the discs 180 and 181 of the pumps in proper relationship to the eccentric bores 186c. In this way, the entire pump assembly is mounted on the spindle head 28 at the top of the common drive shaft 88 and the various intake and discharge passageways enter and leave the pumps through appropriate openings formed in the member 217.

In this self-contained lubricating system for the spindle head 28 there is thus provided two separate fluid pressure pumps 180 and 181 driven by the common drive shaft 88, the pump 180 serving to effect the general lubrication of the change speed gearing and associated bearings and the upper portions of the spindle bearing mounting in the head. The second pump serves to provide means for lubricating additional parts of the transmission but more specifically for lubricating the lower spindle bearings and for removing surplus lubricant which may accumulate around the lower spindle nose portion of the head where the spindle projects outwardly through the bottom of the head. Thus, the latter pump serves to prevent excessive lubricant, utilize for lubricating the spindle bearings, from escaping out of the spindle head and on to the cutter and work and to thereby serve to prevent loss of lubricant from the head 28.

The pump 180 delivers fluid pressure through the line 203, Figures 9 and 15, into a passageway 219 from which the flow divides, part of it passing out through an opening 220 where it sprays upon the bearings 91 and 94 of the drive shaft 88 and the high speed gear 93 respectively and is ultimately caught by the reservoir 237, Figures 4 and 15. The other part of the flow from the passageway 219 passes out through the opening 221 to discharge on the upper spindle bearing 32 and downwardly therefrom on the gear 101 and gear 98. Fluid is delivered from the pump 181 out through the main supply line 210 through a passageway 222, Figure 9, and out through an opening 223 from which it discharges on the shiftable member 96, the thrust bearings 169 and 170, and the lower supporting bearing 92 for the shaft 88.

There are two separate fluid catchment reservoirs provided in the spindle head 28 to receive the fluid discharge from these pumps 180 and 181. The major lubricating flow circulated by the pump 180 out through the line 221, Figures 9 and 15, is caught by the reservoir 224 formed as a cavity in the spindle head 28. Normally, the reservoir 224 is kept filled with liquid up to a level 225 as indicated by an appropriate lubricant level indicating window 226 mounted on the front of the spindle head 28. Fluid is withdrawn, through an appropriate check valve 227, Figure 7 (which maintains fluid in line 202 when the shaft 88 is not rotating), from the passageway 224a forming part of the reservoir 224 through the line and associated passageways 202 returning to the intake lines 194 or 200 of the pump 180. Thus the pump 180 circulates fluid through the line 221 which is ultimately received in the reservoir 224 after supplying and lubricating the various mechanisms associated with the spindle 29 and is withdrawn therefrom by the pump for continuous recirculation, the reservoir 224 maintaining a substantially continuous level of lubricant 225 during this operation.

Fluid delivered by the pump 181 through the line 222 and opening 223 passes in part through the bores 173 and 174 in the shaft 88, Figure 4, past the lubricant shield 171 into a chamber 227a formed by a threaded sleeve 228 mounted in the bore and having an upwardy extending cylindrical sleeve portion 228a projecting inside of the lubricant shield member 171. Lubricant accumulating in the chamber 227a will overflow out through a passageway 229 formed in the shaft 88 and escape outwardly and down through the bearing 92. It will be noted, however, that fluid from the chamber 227 cannot rise above the portion 228a of the sleeve 228 since it is above the drain opening 229. Similarly, no fluid escaping through the bore 230 in the gland 166 can get into the drain opening 229. Therefore, the hydraulic actuating fluid for the gear shifting mechanism cannot mix with the fluid in the lubricating system in the head 28 since any fluid that may escape around the piston rod 164 at the bore 230 passes down through the clearance space 231 formed by the enlarged bore 232 in the shaft 88 surrounding the sleeve member 159 of the cylinder 156 from where it drains out the bottom of the shaft 88 into the column compartment containing the main supporting bearings 86 and 87 for the sleeve 85 from where it is returned to the reservoir 103 in the column 20. Thus, in this way, fluid for the actuating system of the gear shifting mechanism is kept separate and independent of the lubricating fluid for the self-contained lubricating system in the spindle head 28.

Fluid passing down through the bearing 92 drains over the lubricant shield 233, Figure 4, and then out through a passageway 234, Figures 1 and 15, over the spindle bearing 31 and downwardly through the opening 235, Figure 7, to lubricate the lower spindle bearing 30. Lubricant accumulating in the chamber 236 below the bearing 30 is drained off through a passageway 236a into a reservoir 237 formed in the spindle head 28 around the lower portion of the spindle nose 29a and of the spindle 29. The pump 181 continuously withdraws fluid through the check valve 207a (which maintains the line 207 charged with fluid when the shaft 88 is not rotating) and the line and associated passageways 207 so as to prevent any accumulation of fluid in this reservoir 237 and the chamber 236 to thereby prevent fluid from flowing around the lubricant shield 238 at the lower end of the spindle 29 and thus escaping out through the space 239 around the spindle 29 and dripping upon the cutter and a work piece on the work table 25 which would result in interference with the proper manipulation of the machine and loss of lubricant from the spindle head 28.

In this way an efficient self-contained lubricating system has been provided for a vertical spindle sliding head for a milling machine which continuously recirculates lubricant throughout the head mechanisms without loss of fluid therefrom and without intermixing the lubricating fluid with other fluid circulating systems of the machine. It is to be further noted that this self-contained lubricating system for the vertical spindle sliding head is actuated from a common drive shaft which also rotates the cutter spindle at a plurality of different speeds, said shaft containing means for effecting said different speeds and having compensating mechanism whereby said speed changes may be obtained for any relative position to which said head may be moved.

What is claimed is:

1. In a machine tool, a frame, a spindle carrier movable on said frame, means for driving a spindle journaled in said carrier at a plurality of different rates of speed comprising a change speed transmission in said frame, a change speed transmission in said spindle carrier serially connected with said change speed transmission in said frame, a prime mover in said frame connected to drive said change speed transmission in the frame, means for moving said spindle carrier on said frame, and hydraulic actuating means for effecting speed changes in both of said change speed transmissions in sequential relationship to effect a complete range of speed changes in said spindle for any position of said spindle carrier on said frame, including a piston and cylinder, one of which is attached to the frame and the other connected to a shiftable element in the carrier.

2. In a vertical spindle sliding head milling machine, a column, a spindle head vertically reciprocable on said column, a cutter spindle journaled in said head, a shaft journaled in said head, a change speed transmission interconnecting said shaft and said spindle, a prime mover in said column, means in said column engaging said shaft by sliding splined driving connection permitting rotation of said shaft by said prime mover for any relative position of sliding movement of said head on said column, a shiftable gear member on said shaft movable axially thereof to effect speed changes in said change speed transmission, a fluid pressure actuating cylinder mounted on said column and telescopically positioned in said shaft, a piston having a piston rod operating in said cylinder, said piston rod being connected to said shiftable gear member, a source of fluid pressure in said column, and a control device for said source of fluid pressure for alternately connecting said pressure to one end or the other of said cylinder for reciprocating said piston rod to effect shifting of said shiftable gear member, said cyinder serving to shift said gear member and to automatically compensate for the movement of said head on said column while maintaining said gear member in desired predetermined shifted positions.

3. In a milling machine having a spindle carrier, a column for supporting said carrier for relative movement thereon, a cutter spindle journaled in said carrier, a prime mover mounted in the column, a change speed transmission for connecting the prime mover to the spindle including a first part of said transmission mounted in said column and a second part of said transmission being mounted in the carrier, each of said parts including shiftable elements for varying the speed of said spindle, a fluid pressure control mechanism for governing the shifting of said parts in both of said transmissions in a predetermined sequential relationship to produce a prescribed range of speeds for said spindle, fluid operable means for shifting the elements of the second part of said transmission including a piston and cylinder having its axis parallel to the movement of said carrier, one of said parts being fixed and the other connectible to the shiftable element, and means in said mechanism for connecting a source of fluid pressure selectively to one end or the other of said cylinder and maintaining said pressure to hold the shiftable element in either one of its shifted positions during movement of the carrier.

FRED A. HASSMAN.
CHARLES HERFURTH.

REFERENCES CITED

The following references are of record in the file of this patent:

UNITED STATES PATENTS

| Number | Name | Date |
|---|---|---|
| 974,392 | Junggren | Nov. 1, 1910 |
| 1,561,076 | Heitman | Nov. 10, 1925 |
| 1,653,576 | Klausmeyer | Dec. 20, 1927 |
| 1,832,487 | Kearney et al. | Nov. 17, 1931 |
| 2,129,307 | Moo | Sept. 6, 1938 |
| 2,242,445 | Armitage | May 20, 1941 |
| 2,349,597 | Nenninger et al. | May 23, 1944 |